Figure 1:
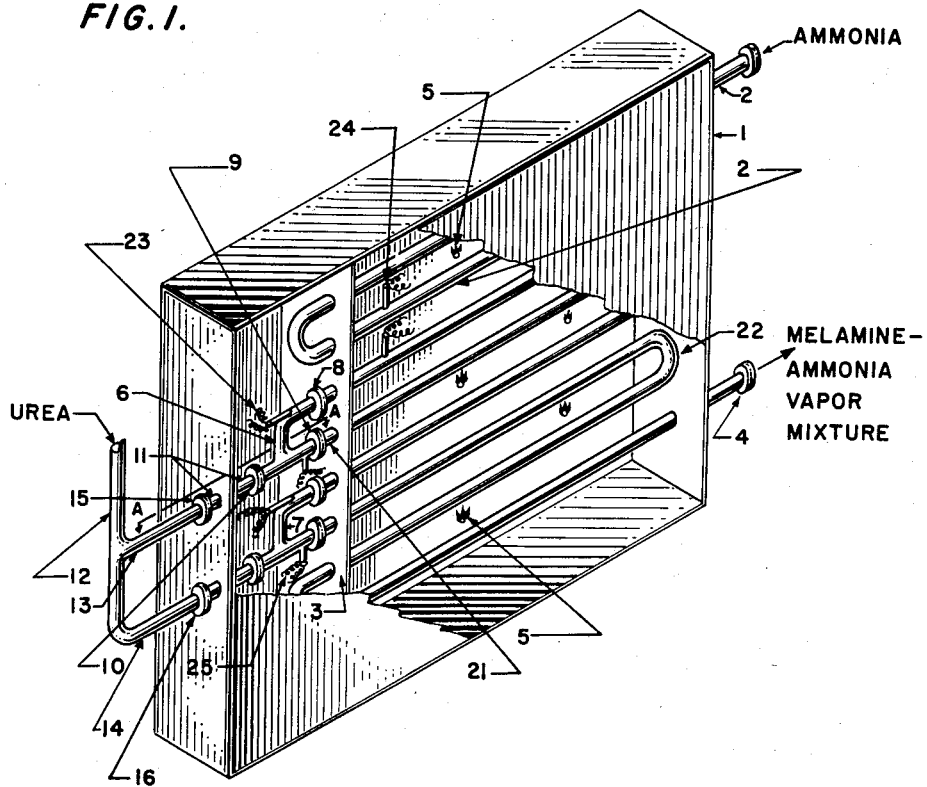

March 8, 1960 W. C. MALLISON 2,927,923
MANUFACTURE OF MELAMINE
Filed April 25, 1956

INVENTOR.
WILLIAM CHARLES MALLISON
BY
ATTORNEY.

2,927,923
Patented Mar. 8, 1960

2,927,923

MANUFACTURE OF MELAMINE

William Charles Mallison, Noroton, Conn., assignor to American Cyanamid Company, New York, N.Y., a corporation of Maine Application April 25, 1956, Serial No. 580,639

4 Claims. (Cl. 260—249.7)

This invention relates to an improvement in those processes for the manufacture of melamine wherein a melamine-forming substance is converted to melamine in a medium comprising pressurized ammonia, and to an improved type of high-pressure reactor for conducting such processes. More particularly, the invention pertains to a novel procedure for introducing a melamine-forming substance into the pressurized ammonia and to a novel continuous tubular high velocity reactor in which a melamine-forming substance is continuously added to the pressurized ammonia, converted to melamine and continuously withdrawn.

Continuous tubular reactors have been used to effect the conversion of a melamine-forming substance to melamine in a moving stream of ammonia. None, however, have been wholly satisfactory for reasons stated hereinbelow. Therefore, it is a principal object of the invention to provide a reactor and process capable of producing high yields of melamine-conversion product of good quality by converting a melamine-forming substance as quickly as practicable in a continuous manner. It is a necessary feature for the successful operation of such a process that it be carried out in a closed vessel capable of withstanding both high temperatures and high pressures. Under such circumstances, the provision of satisfactory high pressure reactors that will maintain the formed product in gaseous or otherwise flowable condition prior to removal has presented serious problems. Not the least of these involve difficulties with clogging and corrosion. Consequently, the provision of a reactor capable of withstanding such high pressures, but operating to produce high yields of melamine product in a commercially-feasible operating time without clogging the reactor, constitutes a more specific object of the present invention.

In the past, it has been stated that a ratio of at least 6:1 of ammonia to melamine precursor can be utilized in converting the latter to melamine. However, in actual practice, this ratio was found to be impossible to attain. Accordingly, the use of large quantities of ammonia gas as the sweeping or reaction medium has been required as a means for reducing clogging within the reactor. The preferred practice has been to utilize a ratio of ammonia to melamine-forming feed substance at a ratio of at least 10:1. Since the ammonia does not enter into the reaction, it is a further object of the invention to increase the capacity and economy of the apparatus by decreasing this circulating load of ammonia. A still further object contemplates the reduction of corrosion within the reactor by the provision of swift conversion of urea or its decomposition products to melamine. Other objects and advantages will become apparent from a consideration of the ensuing description.

In prior known practices, it has also been customary to employ an autoclave-type cylindrical pressure vessel of relatively large internal diameter. This practice is generally unsatisfactory because the larger the internal diameter of the reactor, the greater the difficulty in transferring heat and the greater the local temperature fluctuations. Such local temperature changes result in insolubles formation other than melamine which inevitably result in loss of melamine yield as well as in clogging of the apparatus. This situation can be remedied by painstaking control of temperature. Such control can be generally attained and maintained in plant operation only with the greatest difficulty and expense. To avoid these disadvantages, an approach had been taken whereby a smaller diameter high velocity reactor rather than a low velocity autoclave-type reactor is provided. Unfortunately, when a small diameter high velocity reactor is employed, other and more perplexing difficulties were encountered. For instance, there was found a marked increase in the tendency to plug the reactor with solids formed therein. As the lesser evil, therefore, it has become customary to employ the aforementioned larger internal diameter autoclave type reactor even with all its faults.

It would appear, therefore, to be highly desirable and distinctly advantageous to provide an efficient and simple high velocity continuous tubular reactor of relatively small internal diameter which nevertheless requires only small quantities of ammonia gas in its operation. At the same time, such a procedure should provide also for success in reducing the clogging problem experienced with previously used conventional melamine-producing reactors.

In accordance with this invention, these objectives have been attained. Several essential features are involved. It has been found that a melamine-forming substance consisting of urea or its decomposition products can be preheated to below its decomposition point and can then be conveniently introduced into a high velocity tubular reactor of relatively small internal diameter. The substance is introduced at a plurality of feed points to obtain the desired capacity. At each of the feed points, provision is made for directly introducing said preheated melamine-forming substance into a minimal total quantity of preheated ammonia gas and/or a melamine-ammonia vapor mixture. A temperature of from about 425° C. to about 550° C. at each feed point is maintained and a pressure of at least 750 p.s.i. is utilized. In order to achieve a melamine-forming substance contact feed temperature, the preheated ammonia gas must be maintained at a temperature somewhat greater than 425° C., preferably in the range of 500° C.–600° C. Only when this is done can the preheated ammonia gas convey sufficient sensible heat so that preheated melamine-forming substances can be introduced thereinto at a rate sufficiently high to be commercially feasible without initially forming sufficient insolubles to clog the tubular reactor at the point of contact. Further, according to the present invention, it has been surprisingly found that only when these features are observed that continuous operation is obtainable while avoiding clogging both at the contact feed points and in the reactor.

Withdrawn melamine and ammonia vapor mixture may be treated in any suitable manner for the recovery of melamine. However, a portion of the withdrawn mixture, if so desired, may be recycled to the ammonia gas line of the reactor to be used in lieu of preheated ammonia gas. This, however, is not a critical feature of the present process.

As noted above, in the process of the present invention, it is essential to provide a plurality of feed points at which melamine-forming material is introduced into ammonia gas. For convenience, a reactor containing a two-contact feed point system will be discussed below. However, it is to be understood that this system is only illustrative. Any suitable number of contact feed points or zones of conversion can be provided in a reactor. The number of the contact feed points is limited only by practical considerations of the size of the external shell which houses the reactor. For example, it has been found entirely practical to provide a reactor containing ten to twelve contact feed points which constitute the effective zones of conversion.

Moreover, within mechanical limitations, there is a distinct advantage in providing for a larger number of feed points. While the prior practice required generally a minimum ratio of ammonia to feed of 10:1, the minimum ratio herein can be easily reduced to 5.5:1 of ammonia to feed which is about the minimum necessary for two-feed points and can be reduced to below 1:1 using the larger number of feed points. Obviously, such reduction of ammonia with respect to feed is highly advantageous.

The process of the invention can advantageously be practiced within a pressure range of from about 750 to about 5,000 p.s.i. However, under the conditions of operation, it is preferable to utilize pressures within the range of about from 1,000 to 2,000 p.s.i.

A reaction temperature at each contact feed point of not less than about 425° C. is employed. However, contact feed temperatures up to about 550° C. can be advantageously provided. Nevertheless, to reduce the tendency at the higher temperatures to form compounds other than melamine, it is preferred to operate the process of the invention at temperatures within the range of from about 425° C. to about 475° C. In order to establish and maintain the desired contact feed temperatures, sufficient lengths of tubing are provided between successive contact feed points so that allowance is made for reheating formed melamine and ammonia vapor mixture to a temperature in the range of about 500° C. to 600° C. before contacting added preheated melamine-forming substance at a subsequent feed point.

Figure 2:
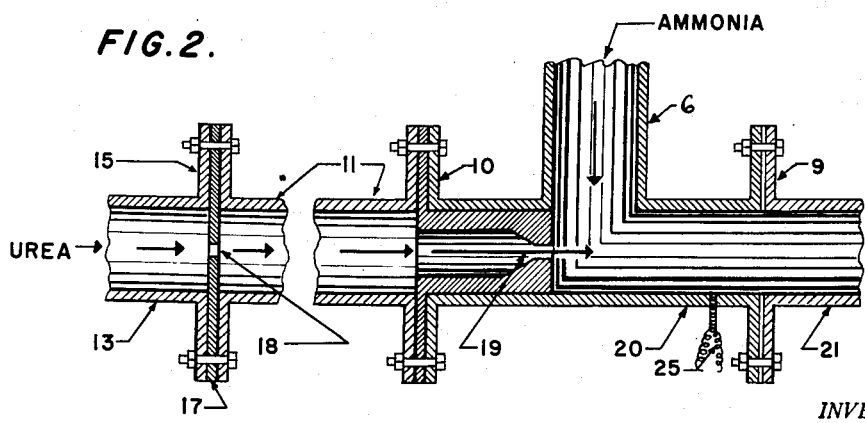

To more clearly define the principles of this invention, details of a preferred embodiment of the reactor and of the process inherent in its operation will be illustrated by the accompanying drawings, in which Fig. 1 is an isometric assembly drawing with parts broken away showing the housing for the reactor, the tubular reactor itself, the several inlet parts, contact feed points and product outlet; and Fig. 2 is an enlarged transverse sectional view taken along line A—A indicated by arrows, of one of the two contact feed points and which figure further illustrates the introduction of melamine-forming precursor into a preheated ammonia stream.

Referring to Fig. 1, it will be seen that the apparatus comprises a horizontally, elongated box-like housing or shell containing a continuous tubular reactor. This housing is indicated by reference to numeral 1. The housing is preferably internally brick lined or otherwise insulated (not shown) to reduce heat loss. An inlet pipe 2 of small internal diameter enters at the upper end of the right side panel of housing 1. Pipe 2 extends through said side panel and is positioned parallel to the upper and topmost panel of box-like housing 1. Pipe 2, which can be fabricated from stainless steel, titanium or the like, passes through a divider 3 longitudinally positioned about one-eighth to about one-quarter from the left side panel of housing 1. This divider not only supports the tubing but also separates the enclosed volume of housing 1 into a smaller left hand space and a larger right hand space and functions as a radiation shield as well. As pipe 2 passes through divider 3, it makes a downward U-bend in the form of a C and is returned horizontally through divider 3 and passed horizontally through housing 1 below the inlet tube.

Within housing 1, near the right hand panel, it is again turned downward in a U-bend and horizontally returned through divider 3. This is repeated and a vertical bank of parallel tubes is thus provided within housing 1 and terminating with the passage of exit conduit 4 through said right hand panel of housing 1 near the bottom of said panel. This vertical bank of continuous horizontal tubing constitutes the tubular reactor, To provide sufficient heat for the tubular reactor, gas burners or other suitable heating-producing elements, 5, are positioned along the rear wall of the housing at several convenient spots. These heating elements are all located within said larger space to the right of divider or shield 3. Said larger space constitutes at least about three-quarters of the housing area.

To the left of the divider 3 of Fig. 1 where the U-bends appear, a modification of said U-bends is shown at two instances. This modification comprises the insertion of an inverted h joint, generally designed by reference numerals 6 and 7. Flanges for said h joints are illustratively provided at 8, 9, and 10, which make for easy joining of several sections of pipe, as by use of stud bolts. For example, a pipe 11 leading from the inverted h to the exterior of the housing is joined at flange 10. Further, tubing means for introducing a preheated melamine-forming reactant is provided as through exteriorly located line 12 separates into a plurality of branch lines 13 and 14, respectively. Prior to their entry into the housing, these branch lines are flanged at 15 and 16. However, one such branch line is joined to a section of pipe 11. As is shown in greater detail in Fig. 2, a distributor plate 17 is provided with exteriorly positioned flange 15. The latter distributor plate which contains a single orifice 18 permits a portion of the melamine-forming reactant to enter the tubular reactor through conduit 11. As is further illustrated in Fig. 2, a portion of the melamine-forming substance passes through the pipe 11 into a tapered restriction 19 in pipe 20 positioned in the arm of the inverted h but perpendicular to the leg of said h, to provide a jetting effect at the joint between conduit 6 and 20. Pipe 20, being flanged at 9, joins pipe 21 passing through divider 3. The temperature conditions within the tubular reactor, generally designated by the reference numeral 22, are most readily followed by the provision of suitably positioned thermocouples located in a thermocouple well as at 23, 24 and 25. Such thermocouples are spaced both within the area in which the heating elements appear and in the area in which the h connectors have been provided. The provision of such thermocouples are of critical importance in the operation of the process for which the above described reactor has been especially designed.

The internal diameter of the tubes comprising the reactor can be widely varied depending on the overall design of the reactor. For example, the internal diameter may vary from one-half inch in a small installation to six inches or more in larger ones. However, for most installations it is preferred to employ reactor tubes having internal diameters ranging from three-quarters (¾) of an inch to four (4) inches.

It is a further advantage of the present invention that the apparatus described is a high velocity reactor in which any material present therein will flow therethrough at a velocity of at least three feet per second. Velocities as high as, for example, twenty-five feet per second or more can be tolerated. However, it has been determined that for most reactors contemplated, a velocity in the range of from eight to ten feet per second is very satisfactory.

The operation of the aforementioned exemplary reactor will be further illustrated by way of the following examples. The conversion of urea as one of several melamine-forming precursors will be described for convenience. It should be understood, however, that the conversion of urea to melamine is merely exemplary and that other melamine-forming substances which, in lieu of urea, includes its decomposition products, can be employed with equal advantage. Illustrative of such other melamine-forming substances are: biuret, triuret, cyanic acid and ammonium cyanate.

*Example 1*

Preheated ammonia gas at about 150° C. is introduced under a pressure of about 1,000 p.s.i.g. into the tubular reactor of Fig. 1 (having internal diameter tubes of ¾ inch) through inlet tube 2 while further preheating said ammonia gas at between about 500° C. and 550° C. prior to contact with preheated urea which is maintained at a temperature of about 150° C. The latter molten urea is introduced into the reactor at line 12. It is an advantage to keep line 12 well insulated and steam traced to prevent temperature drops which may cause solidification of the molten urea. As the preheated urea flows through line 12 it passes through branch lines 13 and 14 where it is metered prior to contact with an ammonia gas. As shown in Fig. 1, only a portion of the molten urea passes through the orifice in the distributor plate, which is located in the flange positioned prior to entry into the housing 1. As the metered molten urea passes through the orifice in the distributor plate, it enters the tubular reactor at 11. So-introduced urea is next fed through a restriction in the line 20 as at 19 so as to produce a jetting effect. The jetted molten urea is immediately contacted with ammonia flowing through line 6. A melamine-ammonia vapor mixture contacts urea introduced into branch line 14. Ample length of tubing is provided between successive jetted-urea feed contact points so as to allow for reheating of the stream of formed melamine and ammonia vapor mixture, if necessary, to a temperature of about 500° C. or higher. However, at each feed contact point, such as at 19, molten urea is introduced and injected in amounts which are not permitted to lower the diluent ammonia gas or melamine-ammonia gas mixture stream temperature to less than about 425° C. as measured by the provided thermocouples. In the present example, total ammonia to urea feed ratio of approximately 4.5:1 is employed advantageously while operating the reactor continuously for more than about twenty-four hours without clogging.

Clogging or plugging, however, will occur within minutes when a single contact feed point apparatus is employed under the hereinbefore recited conditions prior to the contacting and mixing of the preheated urea and ammonia.

*Example 2*

The procedure of Example 1 is repeated except that four branch pipes with corresponding feed restrictive orifices in each of the lines are provided. Melamine is continuously produced for more than 24 hours without clogging the lines of the reactor. In this example, the total quantity of ammonia utilized is further reduced to two parts of ammonia gas per part of urea.

*Example 3*

In repeating the procedure of Example 1 in every detail except that eleven branch pipes with corresponding feed restrictive orifices in each of the lines are provided, melamine is continuously produced for more than 8 hours without clogging the lines of the reactor. In this example, the total quantity of ammonia utilized is further reduced to 0.95 part of ammonia gas per part of urea.

*Example 4*

In this example, the effect of decreasing the feed temperature at the point of contact to below 425° C., i.e., to about 400° C. is shown.

Where the contact feed temperature is caused to fall to about 400° C. operating under the conditions of Example 1, plugging within the reactor occurs in less than five minutes.

*Example 5*

Preheated urea, maintained at a temperature of about 160° C. and a pressure of approximately 1,250 p.s.i., is introduced into a six contact feed point reactor, similar to the reactor generally illustrated in Fig. 1. The reactor is constructed with ¾ inch internal diameter tubing. The urea is fed to the reactor at a rate of about 150 pounds per hour. Preheated ammonia, maintained at a temperature of about 540° C. under a pressure approximating that of the introduced urea, is introduced into the reactor at a feed rate of about 335 pounds per hour. At each of the contact feed points, the preheated urea is converted to melamine and is continuously withdrawn from the reactor. In maintaining this ammonia:urea feed ratio of approximately 2.4:1, i.e., (335/150) at the above preheats, the temperature at the zone of urea and ammonia contact is maintained at about 430° C. The reactor continuously operates for several days without clogging.

*Example 6*

Following the procedure of the preceding Example 5, the ammonia feed rate is decreased by increasing the urea feed rate to 175 pounds per hour. This procedure results in a temperature drop to below 425° C. at the point of contact. The urea feed pressure rapidly rises to above 1,250 p.s.i. which indicated that clogging or plugging occurs within five minutes.

I claim:
1. A method for continuously preparing melamine which comprises: establishing a confined continuous flow comprising a known weight per unit time of ammonia gas at an initial temperature above 425° C. under a pressure of at least 750 p.s.i.; separately establishing a preheated pressurized flow of a fluid feed comprising a known weight per unit time of a member selected from the group consisting of urea, biuret, triuret, cyanic acid, and ammonium cyanate, and mixtures thereof at a temperature above its melting point but below its decomposition point; continuously introducing a part of said flow of preheated feed into said confined stream at an upstream point whereby a mixed stream at a reduced temperature below said initial ammonia temperature is obtained; maintaining the rate of introduction of said part of said fluid feed such that said reduced temperature will be above about 425° C. thereby forming a mixed vapor flow comprising melamine and ammonia; heating said mixed vapor flow to an increased temperature between about 500° and about 600° C.; thereafter introducing the remainder of said fluid feed into at least one additional downstream point, the weight ratio of the original flow of preheated ammonia gas to the total flow of fluid feed being less than about 5.5 to 1; maintaining the rate of introduction at each said additional point such that the resultant reduced temperature of resultant mixed flow is above about 425° C.; after each said additional introduction of fluid feed reheating the resultant mixed flow to an increased temperature between about 500° and about 600° C.; withdrawing mixed vapor flow after the last reheating and recovering melamine therefrom.

2. The process according to claim 1 in which the reduced temperature of the mixed flow after each introduction of fluid feed is within the temperature range of from about 425° C. to about 475° C. before reheating.

3. The process according to claim 1 in which the melamine-forming substance is urea.

4. The process according to claim 3 in which the urea is preheated to a temperature above about 132° C. and below its decomposition temperature at the operating pressure.

References Cited in the file of this patent

UNITED STATES PATENTS

| 2,089,038 | Pyzel | Aug. 3, 1937 |
| 2,492,407 | Tomany | Dec. 27, 1949 |
| 2,549,492 | Lee | Apr. 17, 1951 |
| 2,566,223 | Mackay | Aug. 28, 1951 |
| 2,566,227 | Paden | Aug. 28, 1951 |

FOREIGN PATENTS

| 502,843 | Canada | May 25, 1954 |
| 740,051 | Great Britain | Nov. 9, 1955 |